United States Patent [19]

Peter

[11] Patent Number: 5,767,490
[45] Date of Patent: Jun. 16, 1998

[54] APPARATUS FOR FUSING TWO WORKPIECES PRODUCED FROM SHEET METAL BY INDUCTION HEATING

[75] Inventor: Arne Peter, Donmills, Canada

[73] Assignee: AB Volvo, Gothenburg, Sweden

[21] Appl. No.: 557,037

[22] PCT Filed: May 25, 1994

[86] PCT No.: PCT/SE94/00490

§ 371 Date: Mar. 26, 1996

§ 102(e) Date: Mar. 26, 1996

[87] PCT Pub. No.: WO94/29068

PCT Pub. Date: Dec. 22, 1994

[30] Foreign Application Priority Data

Jun. 11, 1993 [SE] Sweden .................. 9302009

[51] Int. Cl.⁶ .................................................. H05B 6/06
[52] U.S. Cl. .......................... 219/603; 219/614; 219/659; 219/645
[58] Field of Search .................... 219/603, 612, 219/614, 617, 659, 611, 645

[56] References Cited

U.S. PATENT DOCUMENTS

| | | | |
|---|---|---|---|
| 2,678,370 | 5/1954 | Denneen | 219/659 |
| 2,862,092 | 11/1958 | Cowan | 219/617 |
| 2,964,607 | 12/1960 | Frumkin | 219/612 |
| 3,395,261 | 7/1968 | Leatherman et al. | 219/659 |
| 4,224,494 | 9/1980 | Reboux et al. | 219/659 |
| 4,947,462 | 8/1990 | Moe | 219/611 |
| 5,240,167 | 8/1993 | Ferte et al. | 219/611 |

*Primary Examiner*—Philip H. Leung
*Attorney, Agent, or Firm*—Rader, Fishman, Grauer & McGarry

[57] ABSTRACT

An apparatus for welding together two metal sheets (4, 5) includes clamping rails (17, 18; 23, 24) for positionally fixing the sheets (4, 5) each on a table (2, 3), and an induction device movable towards and away from a joint (15) between the metal sheets (4, 5) and along the direction (16) for heating the metal sheets (4, 5) in the joint region (15). The induction device displays a first conductor which extends along and adjacent the joint (15). The clamping rails (17, 18; 23, 24) are disposed two (17, 23) at the one sheet (5), and two (18, 24) at the other sheet (4), one on either side of each respective sheet, and along and a slight distance away from the joint (15). The clamping rails (17, 18; 23, 24) are disposed without electric conducting connection with the first conductor, are manufactured from electrically conductive material, and are electrically connected to the sheets (4, 5).

25 Claims, 3 Drawing Sheets

APPARATUS FOR FUSING TWO WORKPIECES PRODUCED FROM SHEET METAL BY INDUCTION HEATING

TECHNICAL FIELD

The present invention relates to an apparatus for the fusion in a joint of two workpieces produced from sheet metal, by induction heating thereof, the apparatus comprising means for positionally fixing the workpieces in a joint region and an induction device connectable to a current source for heating the workpieces.

BACKGROUND ART

Increasingly far-reaching demands are placed in the automotive industry on the possibility of employing rational welding processes to fuse together sheet metal parts which later constitute the blanks in a pressing process. By such means, considerable material waste is avoided in that the blank may be given a configuration which corresponds to that of the finished part.

Those blanks which are under consideration here may many times consist of sheet metal materials of different thicknesses, and the sheet material may have different types of surface coatings. In such instance, it is then important that the surface coatings are damaged as little as possible, and that the effects of heat on the material are also kept within very narrow limits.

The prior art technology employed for welding in similar or identical practical applications to the present one has previously been resistance welding using copper wheels as electrodes (seam welding). Such a method is relatively simple and economical but does not guarantee high and uniform quality, since an overlap joint must be employed.

Laser welding has also previously been tried in practical applications of the type under consideration here. This welding method results in superior quality because of welding in a butt joint. However, productivity is low and investment costs are so high that this method can only be employed in exceptional cases.

U.S. Pat. No. 4,947,462 discloses an apparatus of the type mentioned by way of introduction. The apparatus according to this patent specification is designed for fusing tubes end-to-end. Since the workpiece is accommodated interiorly in the coil, favourable electric/magnetic conditions are created, but the coil must be dimensionally adapted wholly to suit the workpieces which are to be welded.

The technology disclosed in the above-considered US patent specification cannot, therefore, be applied in the fusion of sheet metal blanks in which the joint lengths may be considerable, up to 1 meter or more. Furthermore, considerable problems would occur at the ends of the joint, since it would be extremely difficult to achieve sufficiently great current density in the corner regions of the workpieces located there.

One variation of resistance welding is also previously known in the art in which electric terminals are directly connected to the workpieces at opposing ends of the joint and on both sides thereof. In order to concentrate the current paths to strip-shaped regions along the joint, use is made of high frequency current, which also passes through a conductor which is disposed in parallel with and along the joint a short distance therefrom.

This welding method gives better welding quality right out in the end regions of the joint, but presents considerable practical problems because of the demand on good electric contact direct with the workpieces. These problems are particularly manifest when the workpieces do not have exactly the same width or when they are of different thicknesses or carry different surface coatings.

PROBLEM STRUCTURE

The present invention has for its object to realise an apparatus of the type disclosed by way of introduction, the apparatus being designed in such a manner that it is capable of fusing sheet metal parts in a butt joint, with superior quality, at high productivity and reasonable cost, even if the sheet metal parts are of different thicknesses or are surface coated. The present invention further has for its object to realise an apparatus which affords satisfactory weld quality right out in the end regions of the joint. Finally, the present invention has for its object to realise an apparatus in which one and the same induction device may be employed for a plurality of workpieces of different designs and configurations and in which the induction device is designed for long service life and generating thermal effect on the workpieces only within a very narrow zone.

SOLUTION

The objects forming the basis of the present invention will be attained if the apparatus intimated by way of introduction is characterized in that the induction device includes a first conductor, which extends along and adjacent the joint; that the positionally fixing means are disposed at each workpiece, at least one on either side thereof, and along and a slight distance from the joint, the positionally fixing means being disposed without electric conducting communication with the first conductor and being produced from an electrically conducting material.

According to one preferred embodiment, it further suitably applies that the positionally fixing means are electrically connected to each respective workpiece.

Further advantages will be attained if the apparatus according to the present invention is also given one or more of the characterizing features as set forth in appended claims 3 to 11.

BRIEF DESCRIPTION OF THE ACCOMPANYING DRAWINGS

The present invention will now be described in greater detail hereinbelow, with particular reference to the accompanying Drawings. In the accompanying Drawings.

DESCRIPTION OF PREFERRED EMBODIMENT

Figure 1:
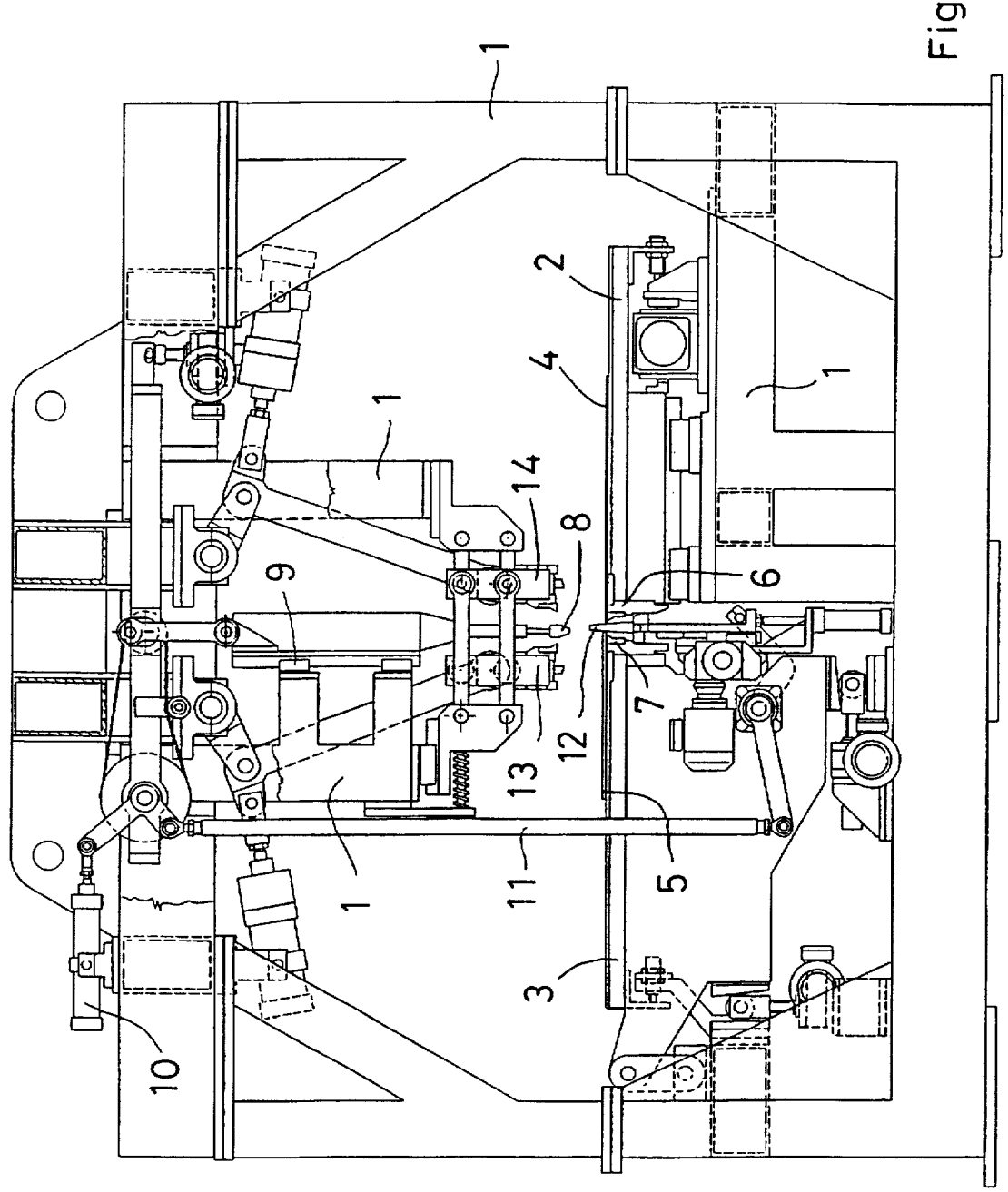
FIG. 1 is a vertical side elevation, partly in section, through the apparatus according to the invention.

In FIG. 1, reference numeral 1 relates to a frame for the apparatus according to the invention. In the frame, there are suitably disposed two supporting tables 2 and 3, respectively, for those metal sheets 4 and 5, respectively which are to be welded. In this instance, it will be apparent that the metal sheets 4 and 5 may be of different thicknesses, and the joint between them is at right angles to the plane of the Drawing and may be of considerable length, up to one meter or more.

Figure 2:
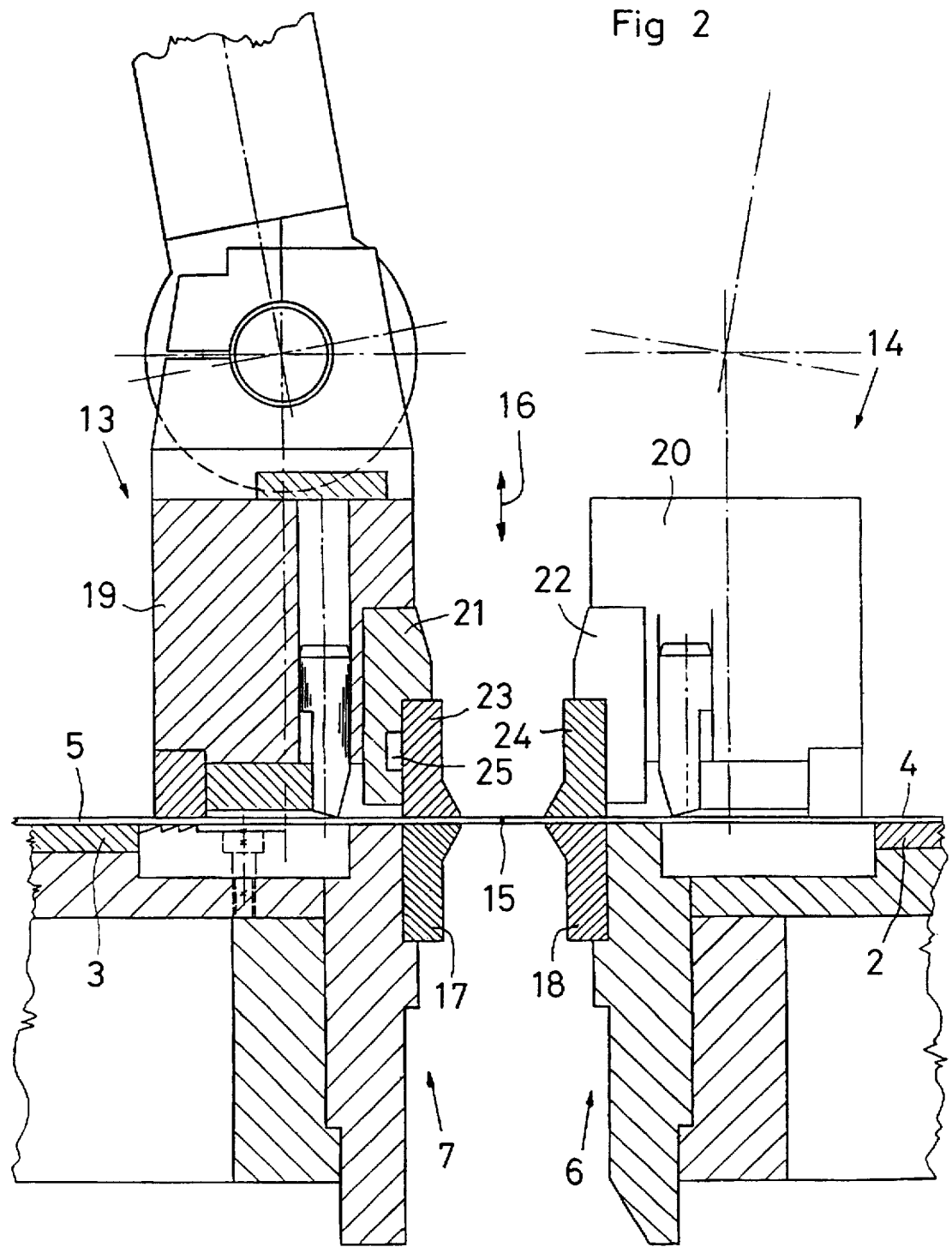
FIG. 2 is a vertical partial section through that part of the apparatus of FIG. 1 where the joint region of the workpieces is located.

However, the subject matter of the present invention is designed for equally advantageous use also in welding of metal sheets 4 and 5 of the same thickness. In the Figures, this alternative is illustrated in FIG. 2.

Mutually facing edges of the tables 2 and 3 are provided with positionally fixing means 6 and 7, respectively, for positionally fixing the metal sheets 4 and 5 during the welding phase. One of the tables, in the illustrated embodiment the table 2, is movable and is connected to an advancement device to be able to advance the sheet 4 towards the sheet 5 during the welding process proper. The advancement length is, in such instance, slight, and lies in the order of magnitude of one or a few tenths of a millimeter and up to a millimeter or so. An induction coil 8 is disposed over mutually facing edges of the tables 2 and 3 and is borne in a sliding guide 9 whereby it is raisable and lowerable from the inactive position illustrated in FIG. 1 to a position immediately adjacent and above the sheets 4 and 5 when these are welded. The distance between the surface of the induction coil 8 facing towards the sheets and the sheets proper must, during the welding phase, be as little as possible since it may be expected that the degree of welding efficiency declines approximately by the square root of the distance. In practice, the distance lies in the range of a few tenths of a millimeter and up to a few millimeters.

The induction coil is connected to a source of high frequency current, whereby it will generate a high frequency alternating field which induces the welding current in the workpieces. The induction coil and the current source are electrically discrete from the workpieces, whereby the requirement for good electric contact with them has been obviated.

As has been intimated above, the induction coil 8 is raisable and lowerable in the sliding guide 9 under the action of a prime mover which is not specified in detail but which, however, includes a cylinder unit 10 for its driving. The prime mover further includes a coupling rod 11 which, via a linkage, is operative to draw down an arrest device 12 which extends up between the metal sheets 4 and 5 in FIG. 1 for aligning the sheets to the correct positions. On lowering of the induction coil 8, this is, therefore, mechanically interconnected with the arrest device 12 so that the arrest device is displaced in a downward direction at the same time as the induction coil 8 is lowered to the welding position immediately above the joint between the sheets 4 and 5.

For urging against the upper surfaces of the sheets 4 and 5, there are provided upper positionally fixing means 13 and 14. The positionally fixing means 13 and 14 are moveably suspended in such a manner that they can be lowered into abutment against the upper faces of the sheets 4 and 5, so that the sheets are held positionally aligned in the correct position in the joint region. Furthermore, at least the one positionally fixing means 14 is disposed in such a manner that it can follow the sheet 4 and the table 2 in their advancement movement during the welding process proper.

FIG. 2 shows, on a larger scale, the positionally fixing means 6, 7 and 13, 14, as well as the sheets 4 and 5 meeting at a joint 15. Further, the vertical path of movement which the induction coil 8 may describe is intimated by means of the double-headed arrow 16.

Along their mutually facing edges, the tables 2 and 3 (illustrated in section in FIG. 2) display rails 17 and 18 which are disposed in recesses and are disposed along and preferably parallel with the joint 15, the rails consisting of a material of good electric conductivity. In order to keep as low as possible heating of the rails 17 and 18, it is advantageous if they are produced from non-magnetic material. The rails 17 and 18 lack the conductive communication with the induction coil 8 and conductors included therein, as well as with the current source. Preferably, the rails 17 and 18 are electrically connected to the sheets 4 and 5 in that the sheets are forced hard against them. Hereby, the current density in the corner regions of the sheets will be increased at the ends of the joint 15.

The positionally fixing means 13 and 14 on the upper side of the tables 3 and 2, respectively, have beams 19 and 20, respectively, which are elongate and extend along the entire joint 15. Hereby, the longitudinal directions of the beams 19 and 20 are at right angles to the plane of the Drawing and the beams are provided with anchorages, partly for the linkage systems by means of which they are suspended in the frame 1 of the apparatus, and partly for operating arms by means of which they are urgeable in a downward direction towards the sheets 5 and 4, respectively.

On their mutually facing edges, the beams 19 and 20 are provided with longitudinal support portions 21 and 22, respectively, which are recessed in shoulders and in which rails 23 and 24, respectively are disposed in corresponding grooves. The rails 23 and 24 correspond to the lower rails 17 and 18, respectively, and may have the same cross-sectional configuration as them.

In electric and magnetic terms, the rails 23 and 24 are designed and produced in the same manner as the rails 17 and 18.

In that the metal sheets 4 and 5 are, in the illustrated manner, clamped between the rails 18 and 24; and 17 and 23, respectively, these pairs of rails will act as current paths whose longitudinal directions are parallel with the joint 15. There will hereby be achieved a reliable short circuit of the eddy currents which are generated in the joint region under the action of the induction coil 8. Furthermore, the current density is increased out in the corner regions of the metal sheets at the opposing ends of the joint 15.

The support portions 21 and 22 may suitably be provided with ducts 25 for circulating cooling water since, because of the current in the rails, a certain thermal generation takes place and heat is also supplied by conduction and radiation. Correspondingly, the lower rails 17 and 18 may also be disposed in connection with suitable cooling water ducts.

Figure 3:
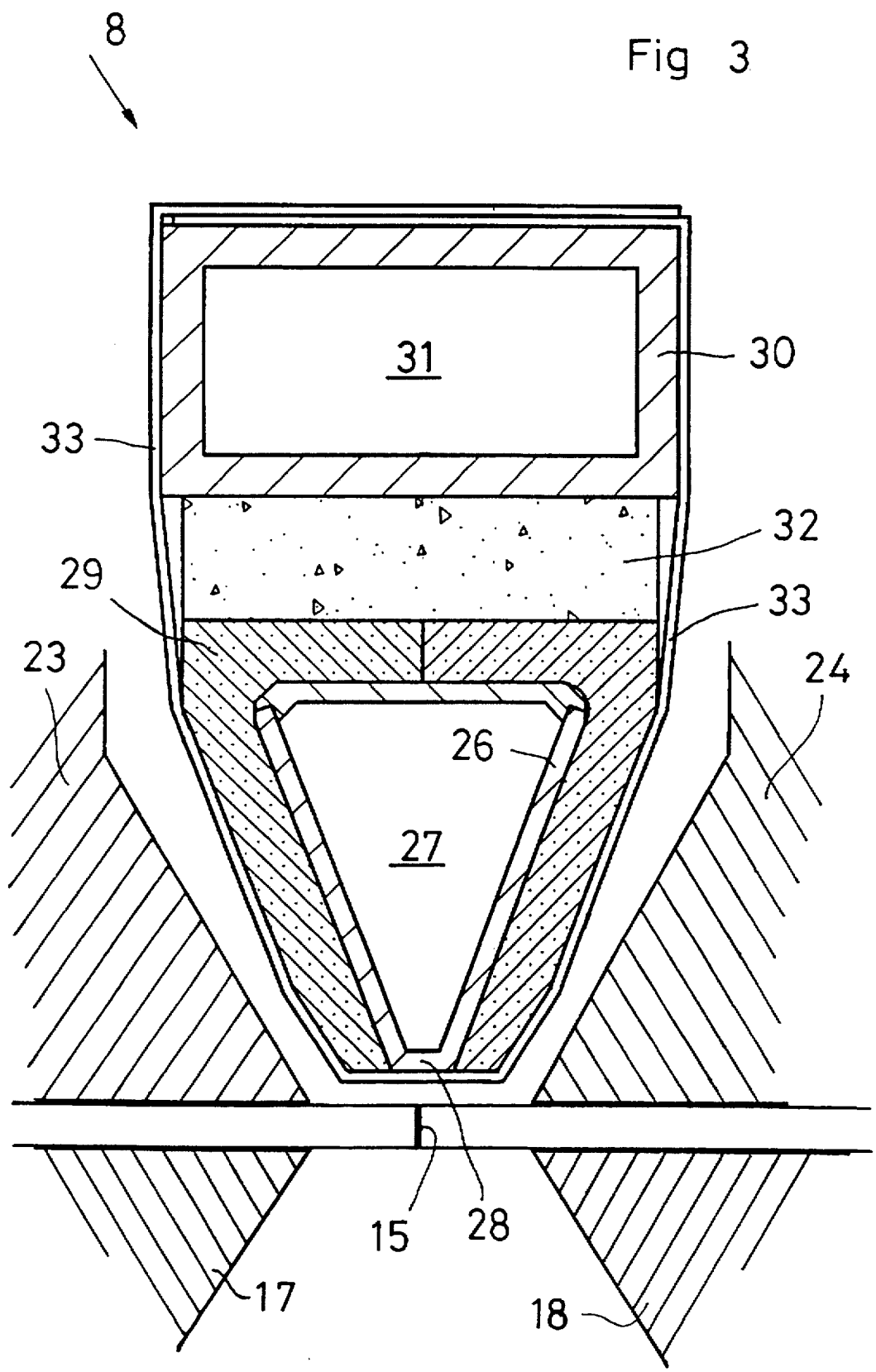
FIG. 3 is a vertical cross section through an induction coil which is employed in the apparatus of FIG. 1.

FIG. 3 shows a vertical section through the induction coil 8, the metal sheets 4 and 5 in the region of the joint 15, and the positionally fixing means 17 and 18; and 23 and 24, respectively. It will be apparent that the induction coil 8 has a first conductor 26 whose longitudinal direction is parallel with the joint 15. The conductor 26 is made of metal possessing good electric conductivity and displays a tubular profile with an interior cooling duct 27. The cross-sectional configuration of the first conductor 26 is such that the cross section tapers in a direction towards the joint. In this instance, the cross section is approximately triangular or acutely trapezoid, so that the cross section will display a tip or a narrow truncated surface 28 facing towards the joint 15.

Around the first conductor 26, there extends a magnetic field conducting device 29 which is produced from a ferromagnetic material and which is in the form of an elongate profile body extending along the entire length of the conductor 26 and being of C-, U- or horseshoe shaped cross section so as to embrace the conductor 26 on three sides.

The magnetic field conducting device consists of a composite material containing small ferromagnetic particles which are bonded together by an electrically insulating binder, whereby the occurrence of eddy currents in the material is prevented. The magnetic field conducting device serves, therefore, the function of an iron core which leads the magnetic field from the region at that side of the first conductor 26 facing away from the joint 15 and to the region where the narrow surface 28 of the first conductor is located. Thus, the greater part of the magnetic field of the induction coil 8 will be concentrated to a narrow, band-shaped zone parallel with the joint 15.

The surfaces of the core 29 facing towards the metal sheets 4 and 5 are substantially planar and lie in the same plane as the narrow surface 28 of the first conductor 26. The widths of these surfaces facing towards the metal sheets may be approximately of equal size.

At its opposing ends, the first conductor 26 is recurved up from the joint 15 and united with a second conductor 30 which is also made of a tubular material so that it has an interior cooling water duct 31. The surface 30 of the second conductor has a discontinuation where the mutually meeting ends are connected to a current source for high frequency alternating current. As a result of the described design of the induction coil 8, it will thus consist of a single turn with a throughgoing cooling water duct 27 and 31, where the greater part of this turn consists of the two elongate conductors 26 and 30 which are approximately parallel with one another.

In order to reduce the flow resistance in the cooling water ducts 27 and 31, seen as whole in the coil 8, it is appropriate if the second conductor 30 is of greater area, and thereby also has a larger cooling water duct 31, than is possible for the first conductor 26.

Both of the conductors 26 and 30 are, as is intimated, disposed with their longitudinal directions parallel. A plane through both of the longitudinal directions of the conductors would further encompass the joint 15 or be parallel therewith.

Between the two conductors 26 and 30, there is disposed a spacer 32 of non-magnetic and electrically insulating material. Further, the induction coil 8 has an outer retention device 33 in the form of a heat-resistant, electrically insulating and non-magnetic material which may be wound about the two conductors and the magnetic field conducting device 29. This retention device 33 need not extend throughout the entire length of the induction coil 8, but may be in the form of windings which are made with even spacing and which tighten the conductors 26 and 30 towards one another.

The induction coil 8 is of a length along the joint 15 so as to cover in the maximum width of the workpieces which can be welded in the apparatus according to the present invention.

Even though the rails 17, 18; and 23, 24 at least extend along the entire length of the joint 15 and are electrically connected to the metal sheets 4 and 5, it may, in certain cases, be difficult to attain sufficiently elevated temperature in the corner regions of the metal sheets 4 and 5 at the ends of the joint. In order to obviate these problems, there are provided, at the ends of the joint 15, means for extra energy supply to the metal sheets, preferably in the form of edge coils disposed on the underside of the sheets, these coils being connected to a high frequency current source so that they amplify, in the metal sheets, the induced currents in the corner regions of the sheets. These edge coils have an upper conductor located most proximal the metal sheets and provided with a counterpart to the abovedescribed magnetic field conducting device. The length of these edge coils, counting in the longitudinal direction of the joint 15, is relatively short and the edge coils are ideally suspended in such a manner that they can be displaced in the longitudinal direction of the joint 15, whereby they can be placed in response to the width of the workpieces.

In electric terms, the edge coils and the induction coil 8 are connected in series with one another or are at least arranged so that the current through the edge coils is proportional to (preferably equal to) the current through the coil 8.

The present invention may be modified without departing from the spirit and scope of the appended Claims.

I claim:

1. An apparatus for the fusion in a joint of two workpieces produced from sheet metal, by induction heating thereof, the apparatus comprising:
   lower and upper fixing means for positionally fixing two workpieces in a joint region; and
   an induction device connectable to a current source for heating the workpieces, said induction device having a first conductor adapted to extend along and adjacent the joint,
   wherein the fixing means are provided without electric conducting communication with the first conductor, the lower fixing means comprise a lower pair of rails made from a non-magnetic material having good electric conductivity, the upper fixing means comprise an upper pair of rails made from a non-magnetic material having good electric conductivity, and at least one of said upper and lower pair of rails being electrically connectable to the workpieces to establish current paths for efficiently short-circuiting of the eddy currents produced by the induction device on the joint region.

2. The apparatus as claimed in claim 1 further characterized in that the upper pair of rails is electrically connectable to the workpieces.

3. The apparatus as claimed in claim 1 further characterized in that both of the pairs of rails are electrically connectable to the workpieces.

4. The apparatus as claimed in claim 1 further characterized in that the rails, on their sides positioned to face the workpieces, have protruding portions extending toward the joint.

5. The apparatus as claimed in claim 4 further characterized in that the first conductor has a cross section which tapers in a direction toward the joint.

6. The apparatus as claimed in claim 5 further characterized in that the induction device comprises a coil having a second conductor substantially parallel with the first conductor and that a plane through the center lines of the first and second conductors extends parallel to the joint.

7. The apparatus as claimed in claim 6 further characterized in that there is provided a magnetic field conducting device extending in a generally U-shaped fashion about the first conductor.

8. The apparatus as claimed in claim 7 further characterized in that the magnetic field conducting device has end surfaces on its shanks which are located on either side of the surface of the first conductor turned to face toward the joint region and are located approximately in the same plane.

9. The apparatus as claimed in claim 8 further characterized in that the magnetic field conducting device extends along substantially the entire length of the first conductor and has an open end facing toward the joint region.

10. The apparatus as claimed in claim 9 further characterized in that the induction device includes edge coils provided at opposite ends of the joint region, said edge coils having conductors on one side of the joint region parallel with the first conductor.

11. The apparatus as claimed in claim 1 further characterized in that the first conductor is of a cross section which tapers in a direction toward the joint.

12. The device as claimed in claim 11 further characterized in that the portion of the first conductor tapering toward the joint extends downwards between the portions of the upper rails protruding toward the joint.

13. The apparatus as claimed in claim 1 further characterized in that the induction device comprises a coil having a second conductor substantially parallel with the first conductor and that a plane through the center lines of these conductors comprises or is parallel with the joint.

14. The apparatus as claimed in claim 13 further characterized in that there is provided, between the first and the second conductors, a spacer of non-magnetic and electrically insulating material and that a retentive material is provided about the conductors, at least along a part of their length.

15. The apparatus as claimed in claim 1 further characterized in that there is provided, in C-, U- or horse shoe-shaped fashion about the first conductor, a magnetic field conducting device produced from ferromagnetic material.

16. The apparatus as claimed in claim 15 further characterized in that the magnetic field conducting device has end surfaces on its shanks which are located on either side of the surface of the first conductor turned to face toward the joint region, and are located approximately in the same plane.

17. The apparatus as claimed in claim 15 further characterized in that the magnetic field conducting device extends along substantially the entire length of the first conductor and has its open end facing toward the joint region.

18. The apparatus as claimed in claim 15 further characterized in that the magnetic field conducting device has a portion thereof located between the first and the second conductors.

19. The apparatus as claimed in claim 15 further characterized in that the magnetic field conducting device extends downwards between the portions of the upper rails protruding toward the joint.

20. The apparatus as claimed in claim 1 further characterized in that the induction device includes edge coils provided at opposing ends of the joint region, said edge coils having conductors on the opposite side of the joint region parallel with the first conductor.

21. The apparatus as claimed in claim 20 further characterized in that the edge coils and the coil with the first conductor are arranged in series.

22. An apparatus for the fusion in a joint of workpieces by induction heating thereof comprising in combination:

two sheet metal workpieces;

an induction device connectable to a current source for heating the workpieces, said induction device having a first conductor extending along and adjacent to the joint;

fixing means for positionally fixing the workpieces in a joint region, said fixing means being provided without electric conducting communication with the first conductor, the fixing means comprising a lower pair of rails and an upper pair of rails, said rails made from a non-magnetic material having good electric conductivity, and at least one of said upper and lower pair of rails being electrically connected to the workpieces to establish current paths for efficiently short-circuiting of the eddy currents produced by the induction device on the joint region.

23. An apparatus for fusing a substantially straight joint of two sheet metal workpieces by induction heating comprising:

an induction device connectable to a current source for heating the workpieces in a joint region, said induction device having a first conductor adapted to extend along and adjacent to the joint;

fixing means for positionally fixing the workpieces in the joint region; and short-circuiting means for short circuiting of eddy currents produced by the induction device in the joint region, said short circuiting means being electrically connected to the workpieces in the joint region.

24. The apparatus as claimed in claim 23 wherein the fixing means comprises one upper pair and one lower pair of rails, a first one of the upper rails and a first one of the lower rails being arranged to clamp between them a first workpiece, the second one of the upper rails and the second one of the lower rails being arranged to clamp between them a second workpiece, and wherein the short circuiting means comprises the rails being made of non-magnetic material having good electric conductivity and being connectable to a current source.

25. A method of fusing two sheet metal workpieces in a substantially straight joint by induction heating comprising:

providing two sheet metal workpieces, each having at least one substantially straight edge;

positionally fixing the substantially straight edges near each other and urging them together in abutting relationship;

applying induction heat to the workpieces in the region along the joint; and short circuiting eddy currents produced in the workpieces by the induction heating by electrically connecting the workpieces along the joint to short circuiting means having good electrical conductivity.

* * * * *